(12) United States Patent
Antchak et al.

(10) Patent No.: US 7,975,821 B2
(45) Date of Patent: *Jul. 12, 2011

(54) TORQUE LIMITED DECOUPLER

(75) Inventors: John R. Antchak, Innisfil (CA); Mark Kaiponen, Richmond Hill (CA); Robert Graniero, Bolton (CA)

(73) Assignee: Litens Automotive Partnership, Woodbridge (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/818,630

(22) Filed: Jun. 18, 2010

(65) Prior Publication Data

US 2010/0252387 A1 Oct. 7, 2010

Related U.S. Application Data

(63) Continuation of application No. 11/814,934, filed on Jul. 27, 2007, now Pat. No. 7,766,774.

(60) Provisional application No. 60/649,520, filed on Feb. 3, 2005.

(51) Int. Cl.
*F16D 41/20* (2006.01)
*F16D 41/06* (2006.01)
*F16D 3/14* (2006.01)
*F16D 7/00* (2006.01)
*F16H 7/00* (2006.01)

(52) U.S. Cl. .................... 192/55.1; 192/55.5; 192/41 S; 474/70

(58) Field of Classification Search .................... None
See application file for complete search history.

(56) References Cited

U.S. PATENT DOCUMENTS

| 2,866,349 A | 12/1958 | Heckethorn |
| 2,885,896 A | 5/1959 | Hungerford, Jr. et al. |
| 2,968,380 A | 1/1961 | Sacchini et al. |
| RE25,229 E | 8/1962 | Sacchini et al. |
| 3,618,730 A | 11/1971 | Mould, III |
| 4,763,764 A | 8/1988 | Smith |
| 5,139,463 A | 8/1992 | Bytezk et al. |
| 5,156,573 A | 10/1992 | Bytzek et al. |
| 5,325,950 A * | 7/1994 | Kimberlin .................... 192/41 S |
| 5,598,913 A | 2/1997 | Monahan et al. |
| 5,722,909 A | 3/1998 | Thomey |

(Continued)

FOREIGN PATENT DOCUMENTS

WO 03104673 A1 12/2003

(Continued)

*Primary Examiner* — David D Le
*Assistant Examiner* — Jacob S Scott
(74) *Attorney, Agent, or Firm* — Harness, Dickey & Pierce, P.L.C.

(57) ABSTRACT

A decoupler assembly is provided for allowing an alternator to be rotatably driven by a serpentine belt in an engine of an automotive vehicle and for allowing the speed of the belt to oscillate relative to the alternator. A hub is fixedly carried by a drive shaft from the alternator for rotation therewith. A pulley is rotatably journaled to the hub by a ball bearing assembly. A bare, helical clutch spring is operatively coupled between the hub and pulley for transferring rotational movement from the pulley to the hub during acceleration of the pulley relative to the hub by the serpentine belt and for allowing the hub to overrun the pulley during deceleration of the pulley relative to the hub. A torque limiter, preferably a spring or sleeve, is wrapped about the torsion spring limiting outward expansion of the torsion spring and isolating the torsion spring from torques above a predetermined limit.

20 Claims, 8 Drawing Sheets

U.S. PATENT DOCUMENTS

| | | | |
|---|---|---|---|
| 6,044,943 | A | 4/2000 | Bytzek et al. |
| 6,083,130 | A | 7/2000 | Mevissen et al. |
| 6,152,845 | A | 11/2000 | Okada et al. |
| 6,761,656 | B2 | 7/2004 | King et al. |
| 7,070,033 | B2 | 7/2006 | Jansen et al. |
| 7,153,227 | B2 | 12/2006 | Dell et al. |
| 7,207,910 | B2 | 4/2007 | Dell et al. |
| 7,275,630 | B2 | 10/2007 | Jansen et al. |
| 7,591,357 | B2 | 9/2009 | Antchak et al. |
| 7,624,852 | B2 | 12/2009 | Mevissen et al. |
| 2004/0014540 | A1 * | 1/2004 | Dell et al. ................ 474/70 |
| 2004/0072641 | A1 | 4/2004 | Nakamura |
| 2004/0104090 | A1 | 6/2004 | Jansen et al. |
| 2005/0250607 | A1 | 11/2005 | Jansen et al. |

FOREIGN PATENT DOCUMENTS

| | | |
|---|---|---|
| WO | WO 2004/011818 | 2/2004 |
| WO | WO 2005/057037 | 6/2005 |
| WO | 2006081657 A1 | 8/2006 |
| WO | 2007003052 A1 | 1/2007 |
| WO | 2007121582 A1 | 11/2007 |

* cited by examiner

TORQUE LIMITED DECOUPLER

This application is a continuation application of U.S. patent application Ser. No. 11/814,934, filed Jul. 27, 2007, now U.S. Pat. No. 7,766,774, which is a U.S. National Stage Entry of International Application No. PCT/CA2006/000129 filed Feb. 3, 2006, which claims the benefits of U.S. Provisional Application Ser. No. 60/649,520, filed Feb. 3, 2005. The entire disclosures of U.S. patent application Ser. No. 11/814,934 and US Provisional Application Ser. No. 60/649,520 are incorporated herein by reference.

FIELD

The present invention relates to a belt drive assembly for driving belt driven accessories in an engine of an automotive vehicle, and more particularly, to a decoupling mechanism for allowing the belt driven accessories to operate temporarily at a speed other than the endless drive assembly and for isolating the torsion spring from excessive torques.

BACKGROUND

An automotive vehicle engine transfers a portion of the engine output to a plurality of belt driven accessories utilizing an endless serpentine belt. Typically, each component includes an input drive shaft and a pulley coupled to a distal end of the drive shaft for driving engagement with the belt. An example of such a belt driven accessory is an alternator.

A decoupler is operatively coupled between the pulley and the alternator to allow the alternator drive shaft to "overrun" or rotate at a faster speed than the pulley and to allow the speed of the pulley to oscillate with respect to the alternator drive shaft due to oscillations in the engine speed. Examples of decouplers are disclosed in U.S. Pat. No. 6,083,130, issued to Mevissen et al. on Jul. 4, 2000, U.S. Pat. No. 5,139,463, issued to Bytzek et al. on Aug. 18, 1992 and International Patent Application No. WO 2004/011818.

In PCT application no. WO 2004/011818, the decoupler reduces torsional fluctuations in the endless drive system. However, in certain applications in which the engine has an aggressive start profile or during conditions of rapid acceleration during a wide open throttle shift, the torques transmitted will over-stress the torsion spring reducing long term durability of the decoupler.

SUMMARY

The disadvantages of the prior art may be overcome by providing a decoupler that prevents torques above a predetermined torque value from overstressing the torsion spring.

According to one aspect of the invention, a decoupler assembly is provided for transferring torque between a shaft and a drive belt. The decoupler assembly includes a hub configured to be fixedly secured to the shaft. A carrier is rotatably mounted on the hub. A torsion spring extends between the hub and the carrier for transferring torque therebetween. A pulley is rotatably coupled to the hub. The pulley has an inner surface formed therein. A clutch spring is secured to the carrier and has a plurality of helical coils frictionally engaging with the inner surface of the pulley to selectively couple the hub and pulley. The torsion spring and the clutch spring are mounted co-axially and wound in opposite senses enabling the clutch spring to expand into gripping engagement with the inner surface during acceleration of the pulley relative to the hub and to contract out of gripping engagement with the inner surface during deceleration of the pulley relative to the hub, while enabling the torsion spring to absorb minor torsional vibrations without decoupling the pulley from the hub. A torque limiter, in the form of a sleeve, is fitted about the torsion spring and is sized to limit expansion of the torsion spring enabling the torsion spring to fully couple the hub with the pulley at or above a predetermined torque.

According to another aspect of the invention, the torque limiter is in the form of a wire coil, which is fitted about the torsion spring and is sized to limit expansion of the torsion spring enabling the torsion spring to fully couple the hub with the pulley at or above a predetermined torque.

DRAWINGS

Advantages of the present invention will be readily appreciated as the same becomes better understood by reference to the following detailed description when considered in connection with the accompanying drawings wherein.

DETAILED DESCRIPTION

Figure 1:
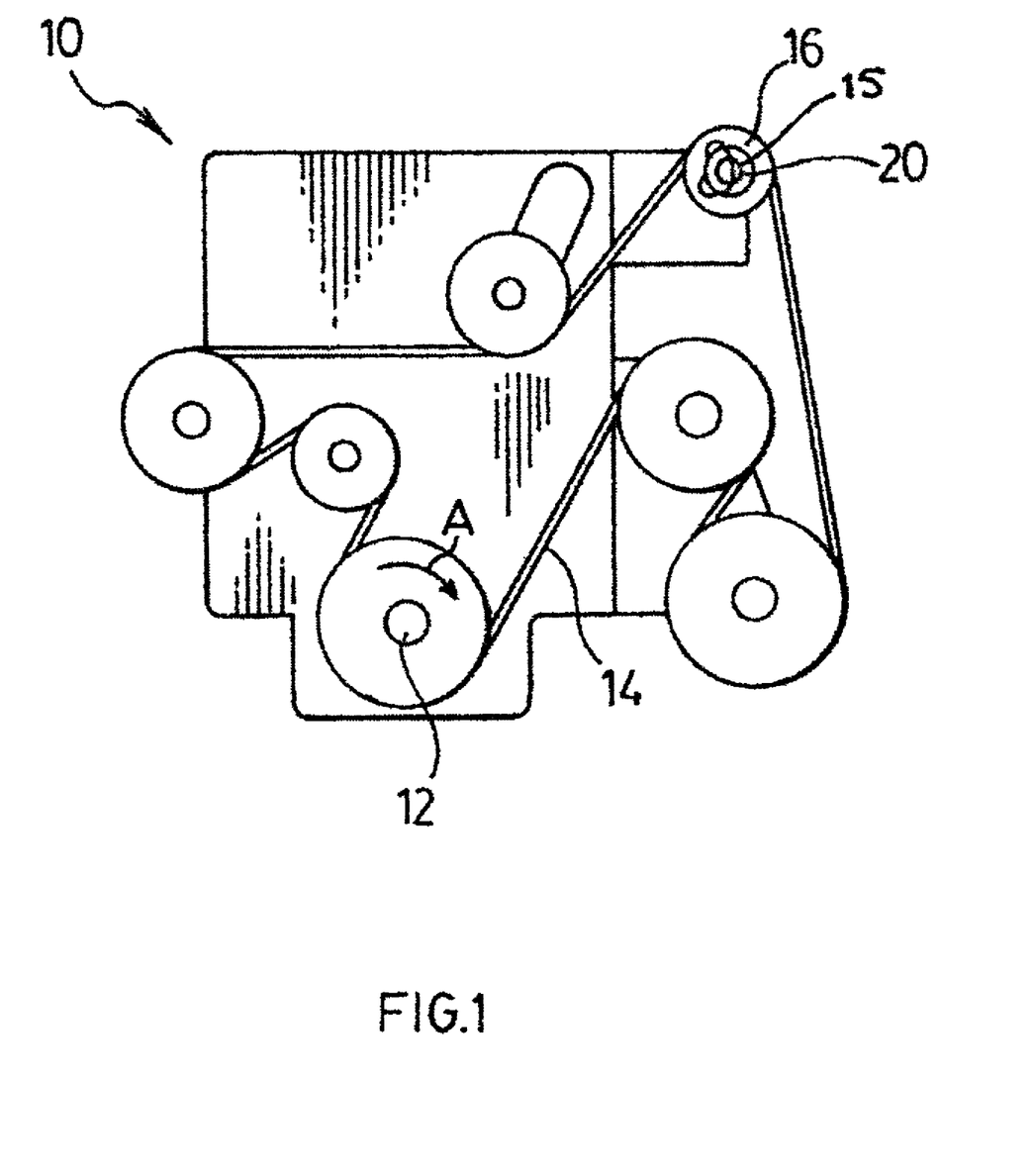
FIG. 1 is a front view of an engine of an automotive vehicle incorporating a decoupler assembly according to one aspect of the invention.

An engine for an automotive vehicle is generally indicated at 10 in FIG. 1. The engine 10 includes a crankshaft 12 driving an endless serpentine belt 14, as commonly known by those having ordinary skill in the art. The engine 10 also includes a belt driven accessory 16 driven by the belt 14. Described in greater detail below, a decoupler assembly 20 is operatively assembled between the belt 14 and the belt driven accessory 16 for automatically decoupling the belt driven accessory 16 from the belt 14 when the belt 14 decelerates relative to the belt driven accessory 16 and allowing the speed of the belt 14 to oscillate relative to the belt driven accessory 16. Additionally, a detailed description of the structure and function of a decoupler assembly can be found in applicant's U.S. Pat. No. 6,083,130, which issued on Jul. 4, 2000 and PCT application no. WO 2004/011818, the contents of which are incorporated herein by reference.

Figure 2:
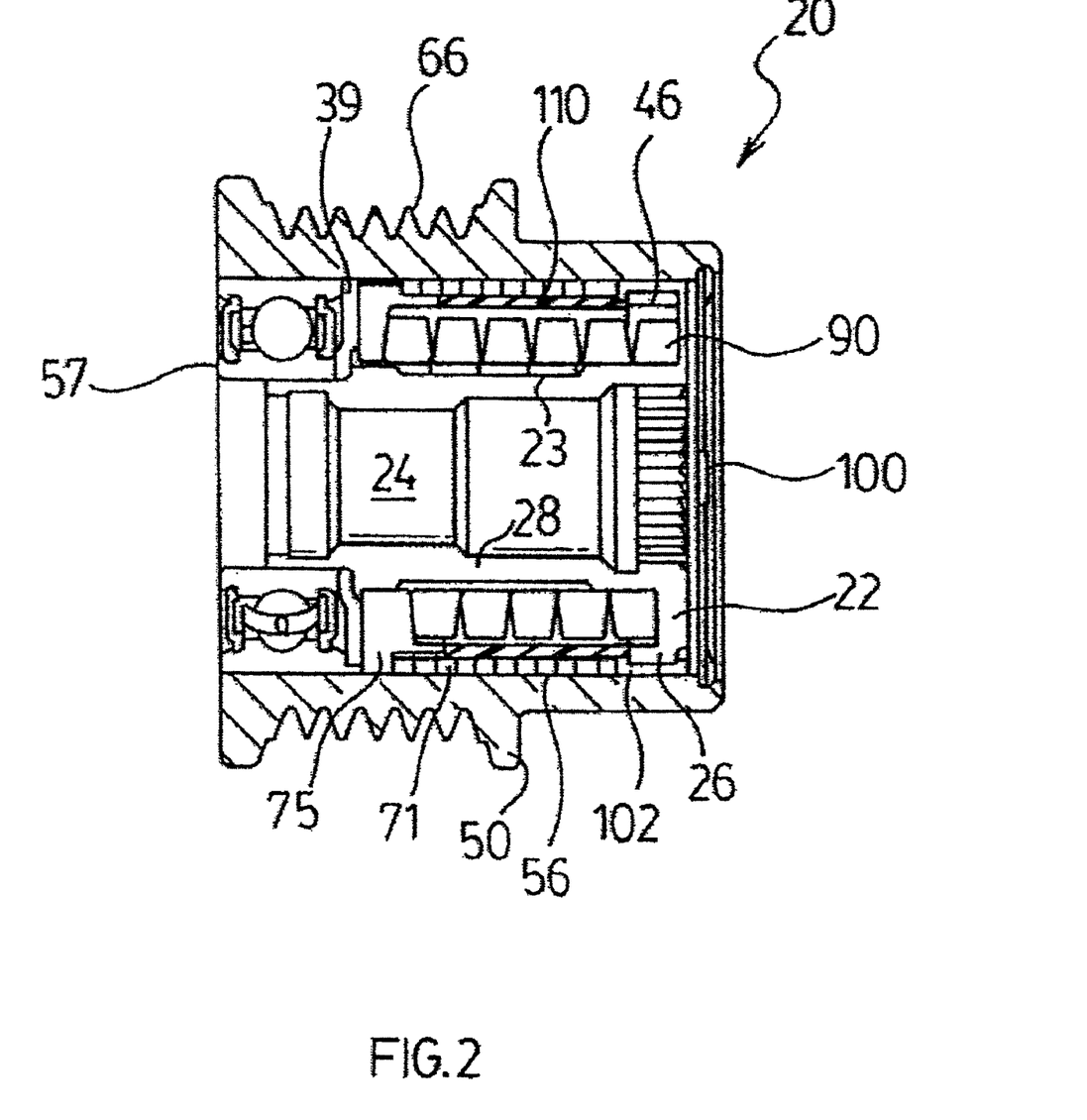
FIG. 2 is an enlarged fragmentary sectional view of the decoupler assembly.
Figure 3:
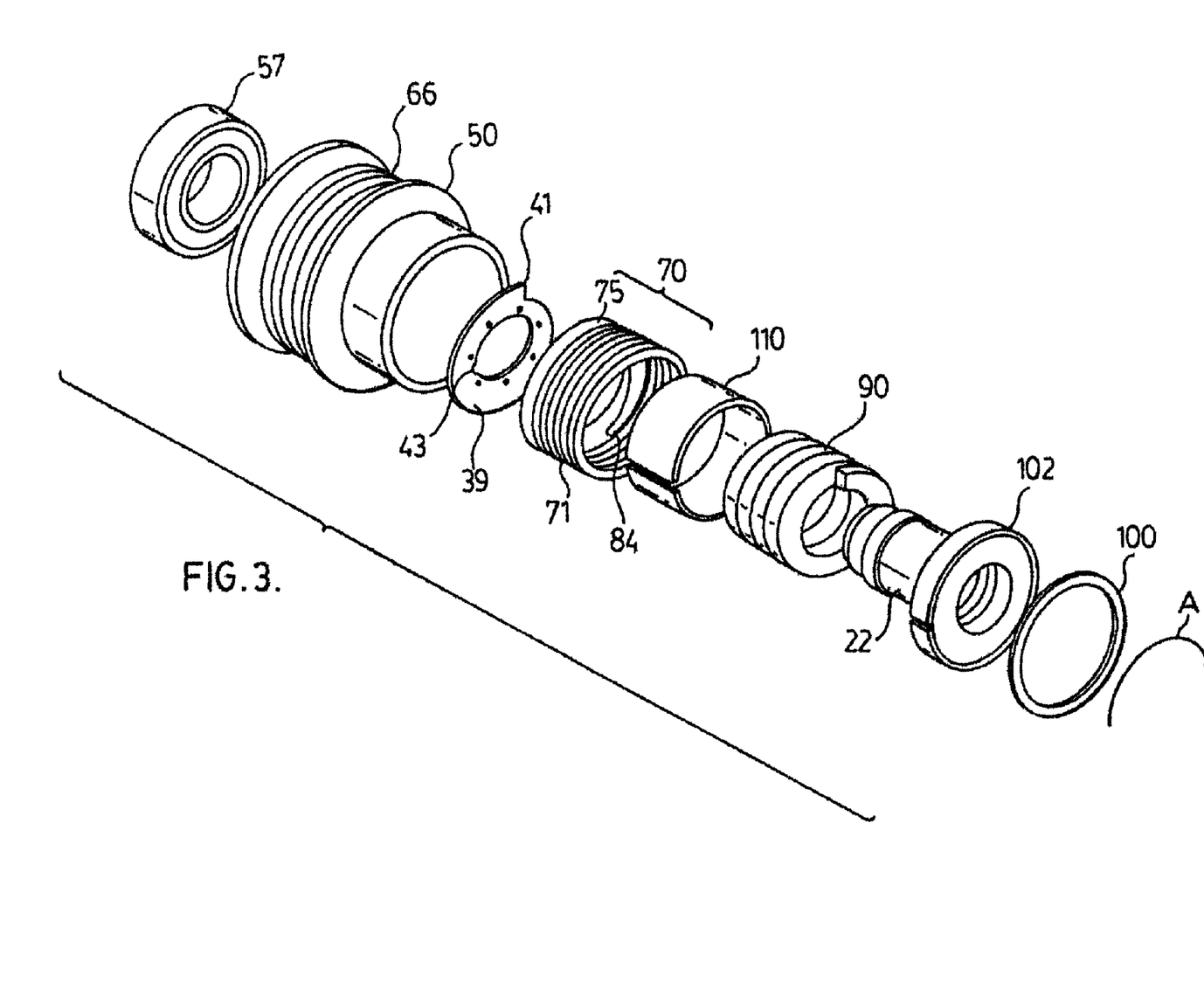
FIG. 3 is an exploded perspective view of a clutch spring in the decoupler assembly of FIG. 2.

Referring to FIGS. 2 and 3, the decoupler assembly 20 generally includes a hub 22, a pulley 50, a clutch assembly 70, a torsion spring 90 and a torque limiter 110. In the first embodiment, the torque limiter 110 is preferably a sleeve.

Hub 22 has a generally cylindrical body 28 having an axially extending bore 24 and a flange 26 at one end thereof. Flange 26 has a generally helical first slot 46 on an inner face thereof. Since the slot 46 is helical, the slot 46 will have a step. The bore 24 is configured for fixedly securing the hub 22 to a drive shaft extending from the belt driven accessory 16.

A pulley 50 is rotatably journaled to the hub 22. A ball bearing assembly 57 is coupled between the pulley 50 and the hub 22 at a distal end while a bushing journal 102 mounts the pulley 50 on the circumferential face of flange 26. The bearing assembly 57 is conventional comprising an inner race, an outer race and a plurality of ball bearings rollingly engaged therebetween. The pulley 50 typically includes a plurality of V-shaped grooves 66 formed on the outer periphery for engaging and guiding the belt 14. Other belt or chain profiles may be utilized to facilitate other drive configurations, well known in the art.

A one-way clutch assembly 70 is operatively coupled between the hub 22 and the pulley 50. The clutch assembly 70 includes a clutch spring 71 and a carrier 75. The clutch spring 71 includes a plurality of helical coils 72. Preferably, the clutch spring 71 is formed from an uncoated, spring steel material and has a non-circular cross-section to improve frictional contact. Most preferably, the cross-section of clutch spring 71 is rectangular or square. The clutch spring 71 is press fitted into frictional engagement with the inner surface 56 of the pulley 50. Preferably, a lubricant similar or compatible with grease used in the ball bearing assembly 57 is applied to minimize wear between the clutch spring 71 and the inner surface 56 of the pulley 50.

The carrier 75 is rotatably mounted on the hub 22. The carrier 75 is generally ring shaped and has an inner face 78, a bore 80 and an outer circumferential surface 82. A slot 84 is formed on the inner face 78 and is configured to retain an end of the clutch spring 71. A generally helical second slot 86 is also formed on the inner face 78 and inside of slot 84, defining a second locating surface 88 and a step.

An annular thrust washer 39 is seated against the end of the carrier 75 and abuts against the inner bearing race of bearing assembly 57. The outer periphery of the thrust washer 39 is circular with a step 41 to complementarily fit with a tab. Thrust washer 39 has one or more radial or circumferential serrations 43 to engage hub 22 and mechanically lock the thrust washer 39 to the hub 22 to prevent relative motion therebetween.

A helical torsion spring 90 is axially compressed between the hub 22 and the carrier 75. The torsion spring 90 and the clutch spring 71 are co-axial and typically coiled in opposite directions. In certain applications, the torsion spring 90 and clutch spring 71 can be wound in the same sense to produce a desired decoupling action. One end of the torsion spring 90 is retained in the first slot 46 of the hub 22 and the other end is retained in the slot 86 of the carrier 75. Axial forces due to the compression of the torsion spring 90 retain the carrier 75 in abutting engagement with the thrust washer 39.

Typically, the shaft of the hub 22 has an area of reduced diameter 23 to provide clearance between the torsion spring 90 and the shaft 28 of hub 22 to prevent uncontrolled contact and friction wear at the interface between shaft 28 and torsion spring 90. Thus, the torsion spring 90 allows relative movement between the carrier 75 and the hub 22 to accommodate minor variations in the speed of the pulley 50 due to oscillations in the operating speed of the engine. The oscillations are not sufficient to activate the clutch assembly 70.

Figure 4:
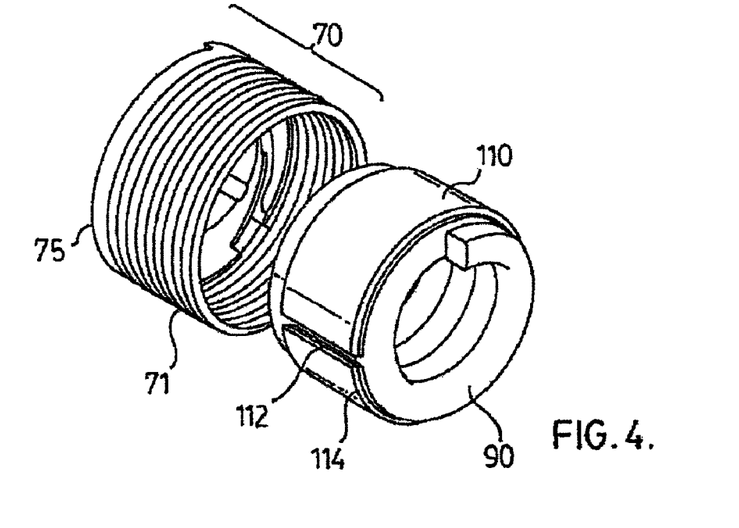
FIG. 4 is an exploded perspective view of the clutch spring and carrier assembly in relation to the torque limiter and torsion spring of the decoupler assembly of FIG. 2.
Figures 5, 6:
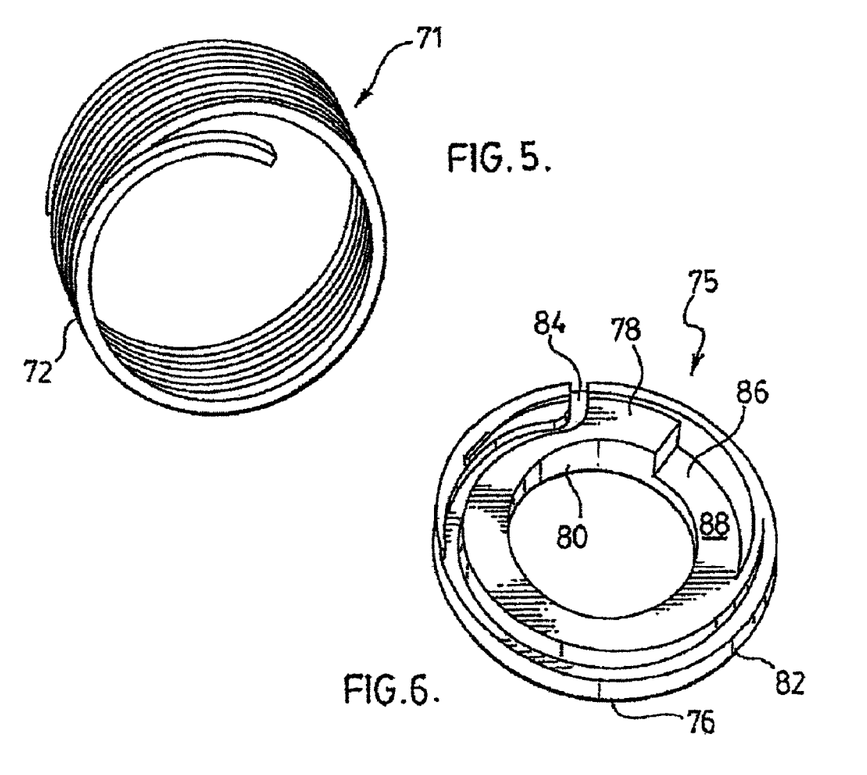
FIG. 5 a perspective view of the clutch spring of the decoupler assembly of FIG. 2.
FIG. 6 is a perspective view of the carrier of the decoupler assembly of FIG. 2.

A torque limiter 110 is wrapped about the torsion spring 90 in a surrounding relation. Preferably, torque limiter 110 has a split or opening 112 and a circumferentially extending shoulder step 114. Shoulder step 114 configures the torque limiter 110 to complementarily fit with bushing 102 mounted on the flange 26 of hub 22. In a first preferred embodiment, torque limiter 110 is an organic resinous material, preferably a Nylon™ material, with or without reinforcement material such as glass fibres, etc. Torque limiter 110 has a thickness selected to take up the play between the torsion spring 90, the clutch spring 71 and the inside diameter of the pulley 50. As torque increases, the torsional spring 90 expands outwardly until physically constrained by the torque limiter 110 against the clutch spring 71 and the inside diameter of bore 56. When the radial clearance between the torsion spring 90, torque limiter 110, the clutch spring 71 and the inside bore 56 of the pulley 50 is closed, the spring 90 is prevented from further expanding, locking the decoupler 10, coupling the hub 22 with the pulley 50. In other words, the torque limiter 110 limits the amount of outward expansion of the torsion spring 90, preventing overloading of the torsion spring 90. The amount of radial expansion of the torsion spring 90 can be calculated and the torque limiter 110 can be designed to ensure that the torque transferred through the torsion spring 90 is maintained below a predetermined torque value.

Figures 7, 8, 9A, 9B:
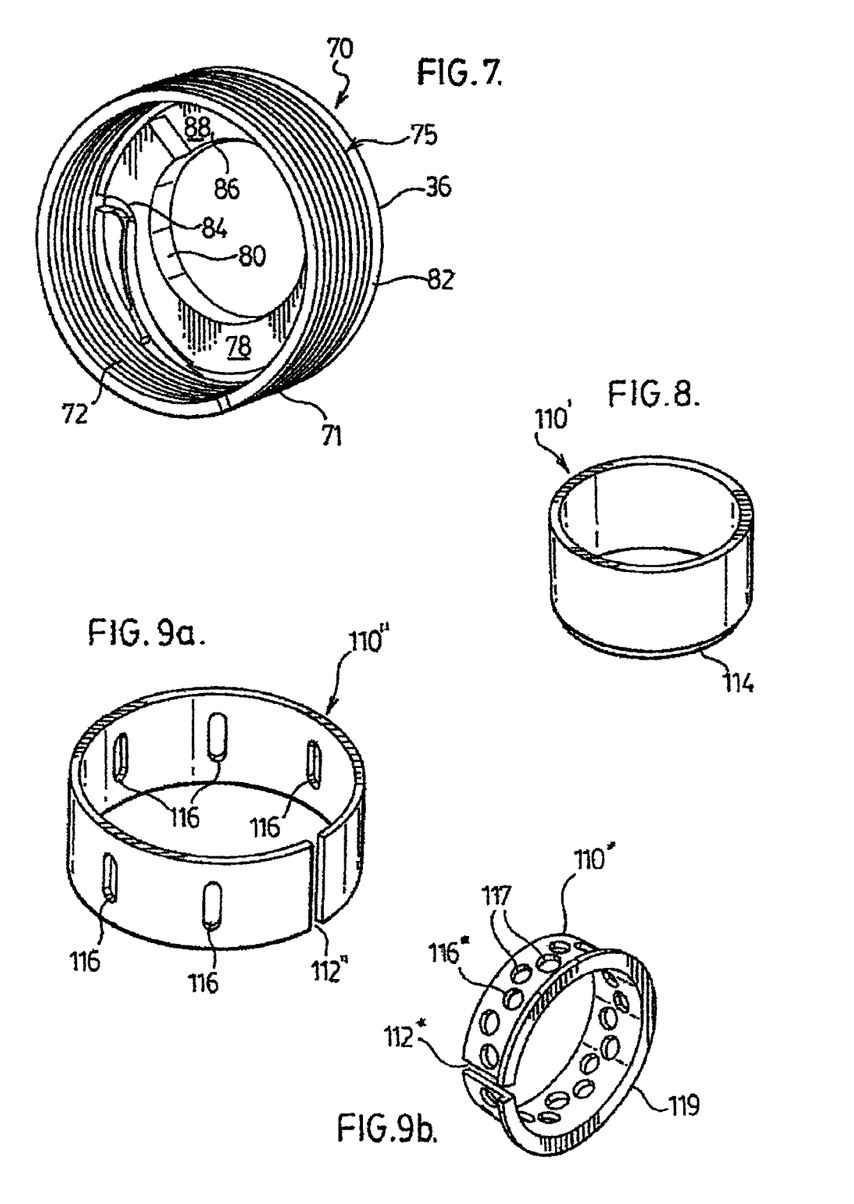
FIG. 7 is a perspective view of the clutch spring and carrier assembly of FIG. 2.
FIG. 8 is a perspective view of a second embodiment of the torque limiter of the decoupler assembly of FIG. 2.
FIG. 9a is a perspective view of a third embodiment of the torque limiter of the decoupler assembly of FIG. 2.
FIG. 9b is a perspective view of an alternate third embodiment of the torque limiter of the decoupler assembly of FIG. 2.

A second embodiment of the sleeve is illustrated in FIG. 8. Torque limiter 110' is a closed metal ring. The metal ring would only expand to a relatively small degree, directly limiting outward expansion of the torsion spring 90.

A third embodiment of the sleeve is illustrated in FIG. 9a. Torque limiter 110" has a plurality of axially elongate openings 116 spaced circumferentially spaced about the torque limiter 110". The openings 116 enable the grease lubricant to travel outwardly to the clutch spring 71.

An alternative third embodiment of the sleeve is illustrated in FIG. 9b. The torque limiter 110* has a series of circumferentially spaced openings 116* and 117. Preferably, openings 116* are elongate and openings 117 are circular and spaced in a regular pattern, resembling dimples on a golf ball. Additionally, torque limiter 110* has an integrally extending radial flange 119 that acts a thrust bearing.

A cap 100 is attached to the end of pulley 50 for preventing contaminants from entering the decoupler assembly 20 and for retaining the lubricant within the decoupler assembly 20.

In operation, the engine 10 is started and the pulley 50 is accelerated and rotated in a driven direction by the belt 14 driven by the engine 10. Acceleration and rotation of the pulley 50 in the driven direction relative to the hub 22 creates friction between the inner surface 56 of the pulley 50 and preferably all of the coils 72 of the clutch spring 71. It should be appreciated that the clutch spring 71 will function even where at the onset at least one of the coils 72 of the clutch spring 71 is frictionally engaged with the inner surface 56 of the pulley 50. The clutch spring 71 is helically coiled such that the friction between the inner surface 56 of the pulley 50 and at least one of the coils 72 would cause the clutch spring 71 to expand radially outwardly toward and grip the inner surface 56 of the pulley 50. Continued rotation of the pulley 50 in the driven direction relative to the hub 22 would cause a generally exponential increase in the outwardly radial force applied by the coils 72 against the inner surface 56 until all of the coils 72 of the clutch spring 71 become fully brakingly engaged with the pulley 50. When the clutch spring 71 is fully engaged with the inner surface 56, the rotation of the pulley 50 is fully directed toward rotation of the drive shaft 15 (FIG. 1) of the belt driven accessory 16. Additionally, centrifugal forces help to retain the clutch spring 71 in braking engagement with the inner surface 56 of the pulley 50.

The rotational movement of the carrier 75 in the driven direction is transferred to the hub 22 by the torsional spring 90 such that the carrier 75, thrust washer 39, hub 22, and the drive shaft 15 (FIG. 1) from the belt driven accessory 16 rotate together with the pulley 50. Additionally, the torsional spring 90 resiliently allows relative movement between the carrier 75 and the hub 22 to accommodate oscillations in the speed of the pulley 50 due to corresponding oscillations in the operating speed of the engine 10.

When the pulley 50 decelerates, the hub 22 driven by the inertia associated with the rotating drive shaft 15 (FIG. 1) and the rotating mass within the belt driven accessory 16 will initially "overrun" or continue to rotate in the driven direction at a higher speed than the pulley 50. More specifically, the higher rotational speed of the hub 22 relative to the pulley 50 causes the clutch spring 71 to contract radially relative to the inner surface 56 of the pulley 50. The braking engagement between the clutch spring 71 and the pulley 50 is relieved, thereby allowing overrunning of the hub 22 and drive shaft 15 (FIG. 1) from the belt driven accessory 16 relative to the pulley 50. The coils 72 may remain frictionally engaged with the inner surface 56 while the pulley 50 decelerates relative to the clutch assembly 70 and the hub 22. The coils 72 of the clutch spring 71 begin to brakingly reengage the inner surface 56 as the pulley 50 accelerates beyond the speed of the hub 22.

In conditions of high loading, such as a fast engine start profile and/or rapid acceleration during a wide open throttle shift, the coils of the torsion spring 90 will be urged to expand outwardly, due to relative rotation between the hub 22 and the pulley 50. The torsion spring 90 will expand, frictionally engaging the torque limiter 110 which will then engage the clutch spring 71. Full frictionally engagement is selected to occur at a predetermined torque value by selecting the thickness of the torque limiter 110. Once fully engaged, the hub 22 will be locked with the pulley 50 and torques above a predetermined torque value will be transmitted directly therebetween. Thus, the higher torques do not overstress the torsion spring 90 and ultimately improving durability of the decoupler assembly 10.

Referring to FIGS. 10 to 14, a fourth embodiment of the torque limiter 110 is illustrated. Elements common with the embodiment of FIGS. 2 and 3 retain the same reference number.

Figure 10:
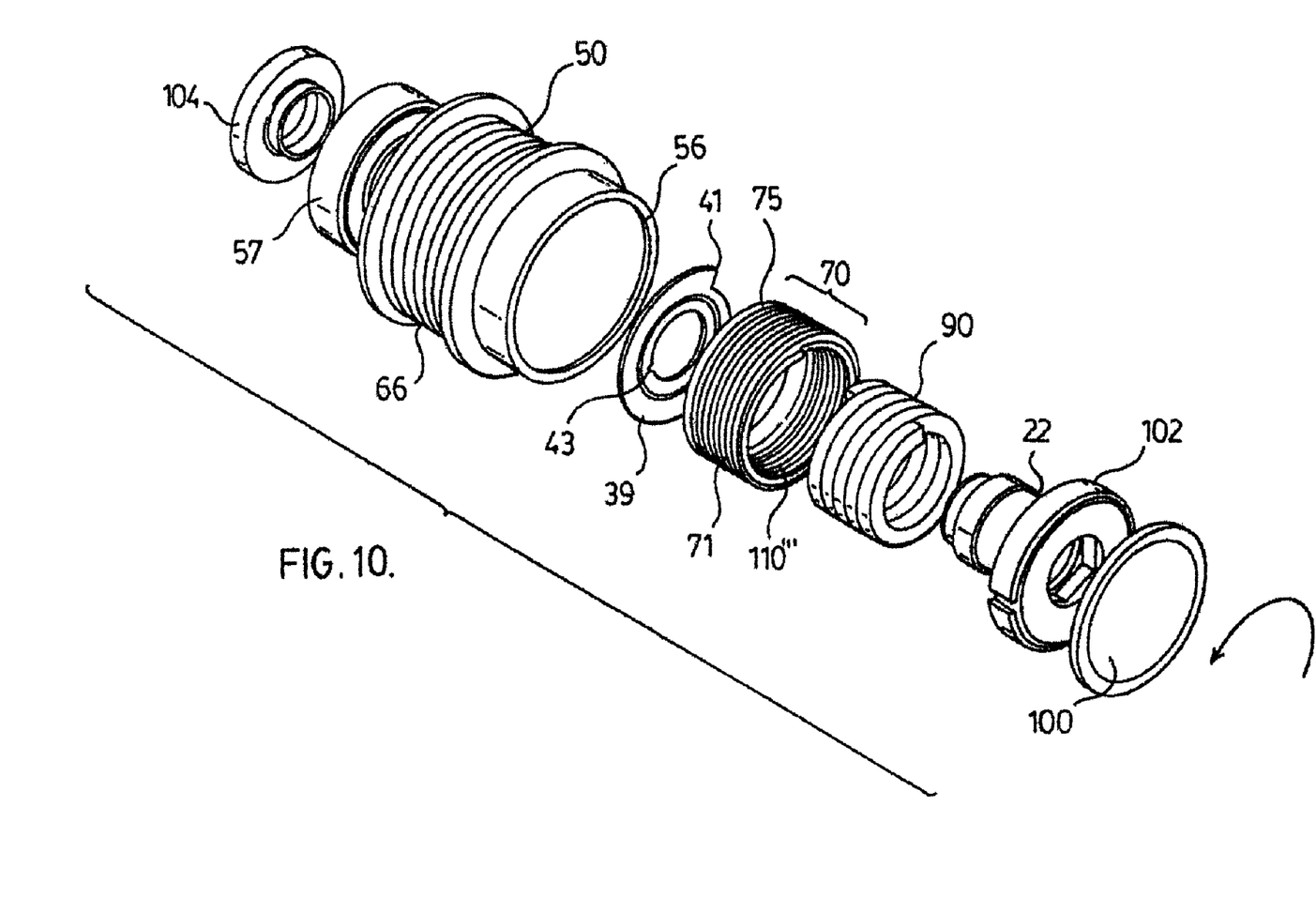
FIG. 10 is an exploded perspective view of the decoupler assembly of a fourth embodiment of the decoupler assembly of the present invention.
Figure 11:
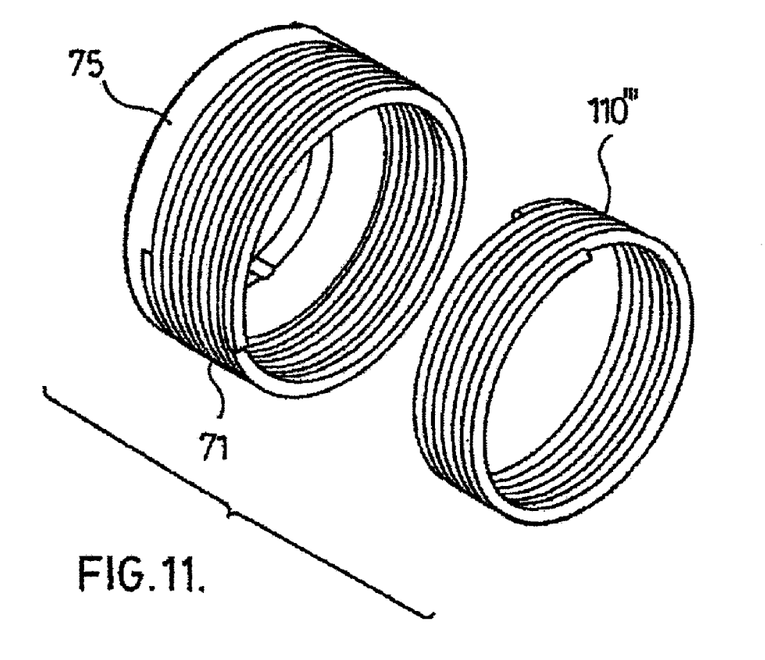
FIG. 11 is an exploded perspective view of the clutch spring and carrier assembly in relation to a torque limiter and torsion spring of the decoupler assembly of FIG. 10.

In this embodiment, the torque limiter 110''' is in the form of a wire coil spring. Torque limiter 110''' is positioned about the torsion spring 90. Preferably, torque limiter 110''' is formed of a small gauge wire, compared to torque spring 90, with a square or rectangular cross-section. The gauge and dimensions of torque limiter 110''' are selected such that any play which would otherwise be present between torsion spring 90, clutch spring 71 and the inside surface 56 of pulley 50 is substantially removed, while still allowing relative motion between torsion spring 90 and clutch spring 71. Further, the coils of torque limiter 110''' allow grease, or any other lubricant, to travel outwardly to the clutch spring 71.

It is presently preferred that the coils of torque limiter 110''' be wound in the same sense of the coils of clutch spring 71, although this is not essential to proper operation of decoupler 20.

As torque to pulley 50 increases, torsional spring 90 expands outwardly until physically constrained by torque limiter 110'''. When the radial clearance between torsion spring 90, torque limiter 110''', clutch spring 71 and the inside surface 56 of pulley 50 is closed, spring 90 is prevented from further expanding, locking decoupler 20, coupling the hub 22 with the pulley 50. In other words, torque limiter 110''' limits the amount of outward expansion of the torsion spring 90, preventing overloading of torsion spring 90.

The amount of radial expansion of torsion spring 90 can be pre-determined and torque limiter 110''' can be designed to ensure that the torque transferred through torsion spring 90 is maintained below a preselected torque value.

Figure 12:
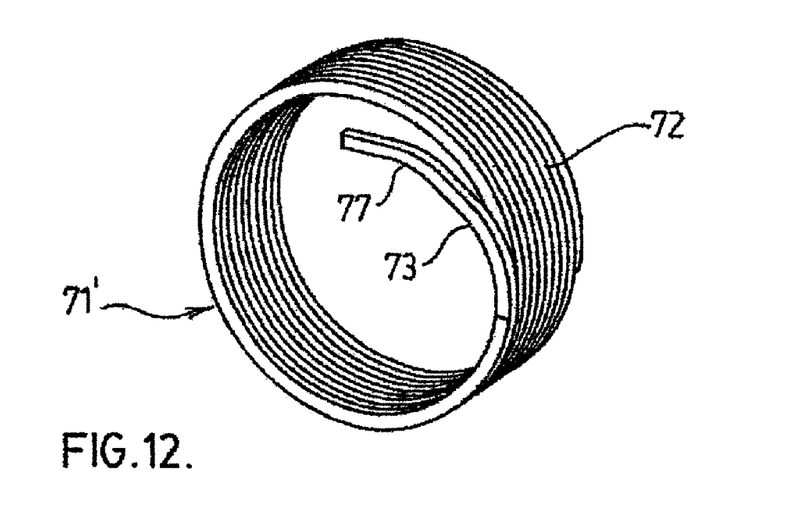
FIG. 12 a perspective view of the clutch spring of the decoupler assembly of FIG. 10.
Figure 13:
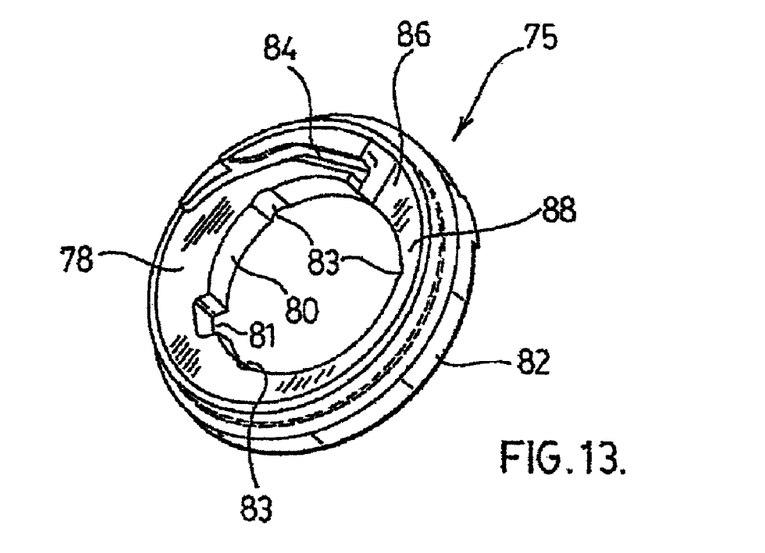
FIG. 13 is a perspective view of the carrier of the decoupler assembly of FIG. 10.
Figure 14:
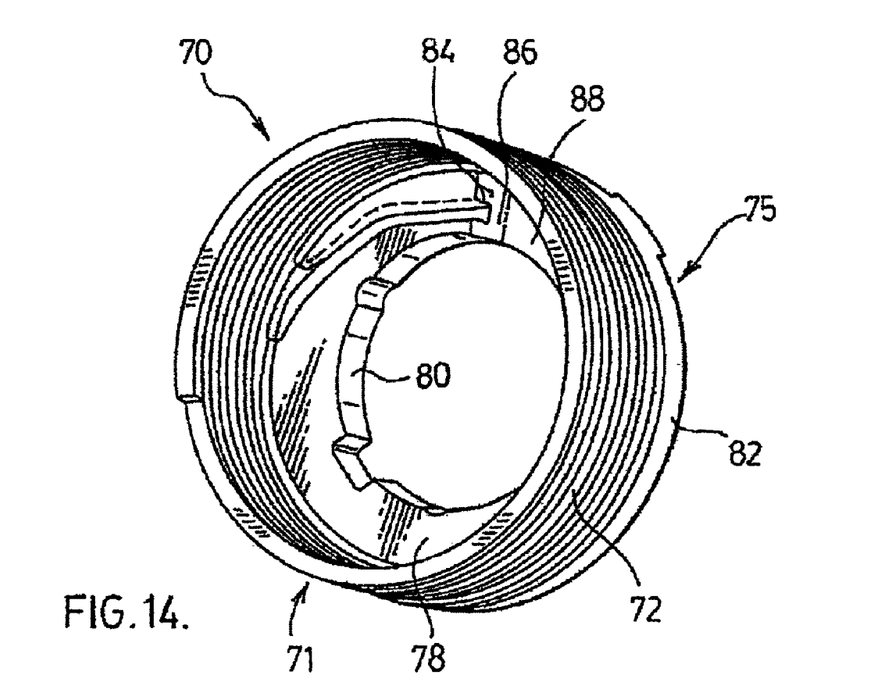
FIG. 14 is a perspective view of the clutch spring and carrier assembly of FIG. 10.

Referring to FIGS. 12 to 14, a second variant of the clutch assembly 70 is illustrated. The clutch assembly 70 includes clutch spring 71', comprising a helical coil, and a carrier 75'. Preferably, clutch spring 71' is formed from an uncoated, spring-steel material and the material forming the helical windings 72 has a non-circular cross-section to improve frictional contact. Most preferably, the cross-section of the helical winding material is rectangular or square. Clutch spring 71' is press-fitted into frictional engagement with the inner surface 56 of the pulley 50. Preferably a lubricant, similar or compatible with the grease used in the ball bearing assembly 57, is applied to minimize wear between the clutch spring 71' and inner surface 56 of the pulley 50.

Carrier 75' is rotatably mounted on the hub 22 and carrier 75' is generally ring shaped, with an inner face 78, a bore 80 and an outer circumferential surface 82. A slot 84' is formed on inner face 78 and is configured to retain an end of the clutch spring 71'. A generally helical second slot 86 is also formed on the inner face 78 and inside of slot 84, defining a second locating surface 88 and a step.

In this variant, the end of clutch spring 71' is bent at 73 and 77. Slot 84' is complementarily configured to receive the end of the clutch spring 71' and frictionally engage with the bends 73 and 77.

The bore 80 of carrier 75' has a keyway 81 and a series of axially extending dimples.

The decoupler illustrated in FIGS. 10 to 14 operates in the same fashion as described with respect to the decoupler illustrated in FIG. 1 to 9.

In conditions of high loading, such as a fast engine start profile and/or rapid acceleration during a wide open throttle shift, the coils of the torsion spring 90 will be urged to expand outwardly, due to relative rotation between hub 22 and pulley 50. The torsion spring 90 will expand, expanding torque limiter 110''' in turn, which will then frictionally engage the clutch spring 71. Full frictional engagement is selected to occur at a predetermined toque value by selecting the thickness of the windings of torque limiter 110.

Preferably, decoupler 20 further includes an adapter 104 which is press fit into the inner race of bearing 57 and which allows decoupler 20 to be fit to belt driven accessories with drive shafts of different sizes and/or to position decoupler 20 on the driven shaft to ensure correct alignment of grooves 66 with the serpentine belt. However, adapter 104 is not necessary and decoupler 20 can be installed directly onto the drive shaft of a belt driven accessory if the diameter of that drive shaft will properly engage the inner race surface of bearing 57 and/or if grooves 66 will be properly aligned with the serpentine belt.

The invention has been described in an illustrative manner, and it is to be understood that the terminology, which has been used, is intended to be in the nature of words of description rather than of limitation. Many modification and variations of the present invention are possible in light of the above teachings. It is, therefore, to be understood that within the scope of the appended claims, the invention may be practiced other than as specifically described.

What is claimed is:

1. A decoupler assembly comprising:
a hub that is adapted to be coupled to a shaft for rotation therewith;
a drive member disposed concentrically about the hub, the drive member being adapted to drivingly engage an endless power transmitting member to permit rotary power to be transferred between the drive member and the endless power transmitting member;
a carrier rotatably mounted on the hub;
a torsion coupling facilitating transfer of rotary power between the hub and the carrier, the torsion coupling comprising a spring;
a clutch spring having an output end, which is coupled to the carrier, and a plurality of helical coils, the helical coils being configured to uncoil into engagement with an inner surface of the drive member to transmit rotary power between the drive member and the spring, the helical coils also being configured to coil to disengage the inner surface to inhibit transmission of rotary power between the spring and the drive member, wherein coiling of the clutch spring, uncoiling of the clutch spring or coiling and uncoiling of the clutch spring is based on relative rotation between the carrier and the hub; and
a torque limiter received between the spring of the torsion coupling and the clutch spring, the torque limiter contacting the spring and the clutch spring when a torque in excess of a predetermined torque is transmitted through the decoupler assembly.

2. The decoupler assembly of claim 1, wherein the torque limiter is a sleeve.

3. The decoupler assembly of claim 2, wherein the sleeve is split.

4. The decoupler assembly of claim 2, wherein one or more openings are formed through the sleeve.

5. The decoupler assembly of claim 4, wherein the one or more openings comprises a helical slot that is formed between opposite axial ends of the sleeve.

6. The decoupler assembly of claim 1, wherein the sleeve is formed of metal.

7. The decoupler assembly of claim 6, wherein the sleeve comprises a coil of wire.

8. The decoupler assembly of claim 7, wherein the wire of the coil that forms the sleeve has a generally square cross-section or a generally rectangular cross-section.

9. The decoupler assembly of claim 8, wherein the coil of wire that forms the sleeve is wound in a sense that is opposite a sense in which the clutch spring is wound.

10. The decoupler assembly of claim 1, wherein the drive member comprises a pulley.

11. A decoupler assembly comprising:
a hub that is adapted to be coupled to a shaft for rotation therewith;
a drive member disposed concentrically about the hub, the drive member being adapted to drivingly engage an endless power transmitting member to permit rotary power to be transferred between the drive member and the endless power transmitting member;
a carrier rotatably mounted on the hub;
a torsion coupling facilitating transfer of rotary power between the hub and the carrier, the torsion coupling comprising a spring;
a one-way clutch disposed between the drive member and the torsion coupling, the one-way clutch comprising a clutch spring that is configured to drivingly engage an interior surface of the drive member to facilitate transmission of rotary power between the drive member and the hub; and
a torque limiter received between the spring of the torsion coupling and the clutch spring, the torque limiter contacting the spring and the clutch spring when a torque in excess of a predetermined torque is transmitted through the decoupler assembly.

12. The decoupler assembly of claim 11, wherein the torque limiter is a sleeve.

13. The decoupler assembly of claim 12, wherein the sleeve is split.

14. The decoupler assembly of claim 12, wherein one or more openings are formed through the sleeve.

15. The decoupler assembly of claim 14, wherein the one or more openings comprises a helical slot that is formed between opposite axial ends of the sleeve.

16. The decoupler assembly of claim 11, wherein the sleeve is formed of metal.

17. The decoupler assembly of claim 16, wherein the sleeve comprises a coil of wire.

18. The decoupler assembly of claim 17, wherein the wire of the coil that forms the sleeve has a generally square cross-section or a generally rectangular cross-section.

19. The decoupler assembly of claim 18, wherein the coil of wire that forms the sleeve is wound in a sense that is opposite a sense in which the clutch spring is wound.

20. A decoupler assembly comprising:
a hub that is adapted to be coupled to a shaft for rotation therewith;
a drive member disposed concentrically about the hub, the drive member being adapted to drivingly engage an endless power transmitting member to permit rotary power to be transferred between the drive member and the endless power transmitting member;
a carrier rotatably mounted on the hub;
a torsion spring facilitating transfer of rotary power between the hub and the carrier;
a clutch spring having an output end, which is coupled to the carrier, and a plurality of helical coils, the helical coils being configured to uncoil into engagement with an inner surface of the drive member to transmit rotary power between the drive member and the torsion spring, the helical coils also being configured to coil to disengage the inner surface to inhibit transmission of rotary power between the torsion spring and the drive member, wherein coiling of the clutch spring, uncoiling of the clutch spring or coiling and uncoiling of the clutch spring is based on relative rotation between the carrier and the hub; and
a coil of wire received about the torsion spring, the wire being sized to contact an inside surface of the helical coils and an outside surface of the torsion spring to limit radial expansion of the torsion spring.

* * * * *